(12) United States Patent
Hunt et al.

(10) Patent No.: US 8,800,253 B2
(45) Date of Patent: Aug. 12, 2014

(54) CONTROL SYSTEM FOR AN IMPLEMENT WITH A ROTARY COMPONENT

(71) Applicant: Deere & Company, Moline, IL (US)

(72) Inventors: Timothy S. Hunt, Cedar Falls, IA (US); Andrew K. Rekow, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 107 days.

(21) Appl. No.: 13/660,592

(22) Filed: Oct. 25, 2012

(65) Prior Publication Data

US 2014/0116017 A1 May 1, 2014

(51) Int. Cl.
*A01D 34/00* (2006.01)

(52) U.S. Cl.
USPC .................................. 56/10.2 R; 180/6.5

(58) Field of Classification Search
USPC ........... 56/10.2 A–10.2 E, 10.2 R, 10.1, 15.4, 56/10.6, 10.8, 11.9, 17.1, 14.7; 180/236, 180/6.2, 6.48, 6.5, 165; 477/1; 701/41, 93
See application file for complete search history.

(56) References Cited

U.S. PATENT DOCUMENTS

| | | | | |
|---|---|---|---|---|
| 5,794,422 A * | 8/1998 | Reimers et al. | ................. | 56/11.9 |
| 6,591,593 B1 * | 7/2003 | Brandon et al. | ................. | 56/10.6 |
| 6,808,032 B2 * | 10/2004 | Wuertz et al. | ................. | 180/6.48 |
| 7,017,327 B2 * | 3/2006 | Hunt et al. | ..................... | 56/14.7 |
| 8,544,570 B2 * | 10/2013 | Ishii et al. | ....................... | 180/6.5 |
| 8,657,041 B2 * | 2/2014 | Ishii et al. | ....................... | 180/6.5 |

* cited by examiner

*Primary Examiner* — Robert Pezzuto

(57) ABSTRACT

A control system is provided for an implement such as a mower having a rotary blade driven by a gear box which is driven by a PTO shaft of a vehicle which is coupled to the mower. The vehicle has a drivetrain which drives the PTO shaft. The control system includes an acceleration sensor for sensing vibrations of the blade and generating a blade vibration signal. A PTO speed sensor generates a PTO shaft speed signal. A control unit is connected to the sensors and to the drivetrain. The control unit generates, as a function of the speed signal, an expected acceleration value representing a blade loss condition and an expected acceleration value range. The control unit compares the vibration signal to the range, and the control unit stops the drivetrain from rotating the blade if the vibration signal is within the range.

15 Claims, 1 Drawing Sheet

CONTROL SYSTEM FOR AN IMPLEMENT WITH A ROTARY COMPONENT

FIELD

The present disclosure relates to a control system for an implement with a rotary component, such as a mower which has rotary blade assemblies.

BACKGROUND

Rotary cutter implements, such as mowers, can be coupled to vehicles, such as agricultural tractors. Such vehicles are becoming more and more automated and are including more monitoring functions. It would be desirable to have a monitoring system which could monitor an implement, such as a mower with a rotary blade.

SUMMARY

According to an aspect of the present disclosure, a control system is provided for a mower which has a rotary blade assembly driven by a drive unit. The mower is preferably coupled to a vehicle, such as a tractor. The drive unit includes a PTO shaft driven by a drivetrain of a vehicle. The control system includes an acceleration sensor for sensing vibrations of the blade assembly and generating a sensed acceleration signal. A drive unit speed sensor generates a PTO speed signal. A control unit is connected to the speed sensors and to the drive unit. The control unit generates, as a function of the PTO speed signal, an expected acceleration value representing a blade loss condition. The control unit also generates an expected acceleration value range. The control unit compares the sensed acceleration signal to the expected acceleration value range, and the control unit stops the drive unit from rotating the blade assembly if the sensed acceleration signal within the range. The control unit may include an implement control unit on the mower, and a vehicle control unit mounted on the vehicle and connected to the implement control unit by a data bus.

DETAILED DESCRIPTION OF THE DRAWINGS

Figure 1:
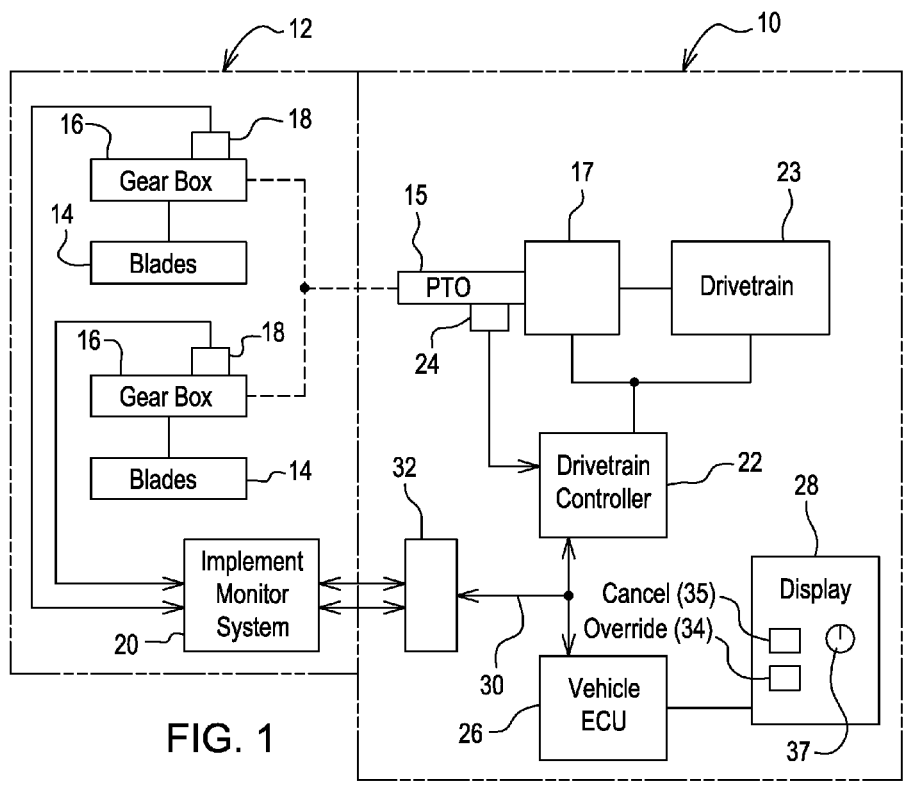
FIG. 1 is a simplified schematic diagram of a tractor and mower monitoring system embodying the invention.

Referring to FIG. 1, a tractor 10 is coupled to an implement such as a mower 12. The mower 12 includes one or more sets of conventional mower blades 14, each of which is driven by a conventional right angle gear box or transmission 16. Each gear box 16 is drivingly coupled to a power take off (PTO) 15 of the tractor 10. At least one accelerometer 18 is mounted on top of each of the gear boxes 16. Each accelerometer 18 is preferably oriented transverse to the direction of travel for the tractor 10 so as to maximize its sensitivity to lateral vibration—vibrations which are in a direction perpendicular to the fore-and-aft tractor-mower axis. The mower 12 also includes an implement electronic control unit (ECU) 20 which is connected to each of the accelerometers 18. Additional accelerometers (not shown) may be mounted on each gear box 16 for back up and redundancy purposes.

The tractor 10 includes a conventional drivetrain 23 which drives the tractor wheels (not shown) and which drives the PTO 15 through a conventional electro-hydraulically operated PTO clutch 17. The tractor 10 also includes a drivetrain control unit 22 which controls the drivetrain 23 and the PTO clutch 17. Preferably, a PTO speed sensor 24 provides a PTO speed signal S(pto) to the drivetrain ECU 22. In this embodiment, the drivetrain ECU 22 calculates the PTO speed ω(pto) from the PTO speed signal S(pto) and provides the data on a the conventional data bus 30. The tractor 10 also includes a display/control unit 28 which is connected to a vehicle ECU 26. Drivetrain control unit 22 and vehicle electronic control unit 26 are connected to the implement ECU 20 via conventional data bus 30, such as an ISOBUS, though a conventional ISOBUS connector 32. Display/control unit 28 includes a variety of information displays for displaying information to an operator. If the tractor 10 is an autonomous vehicle, then it could include an intelligent vehicle control unit (not shown) in place of or in addition to the vehicle ECU 26.

Each accelerometer 18 generates an acceleration or vibration signal A which represents the vibration of the gear box 16 upon which it is mounted. The implement ECU 20 receives the vibration signals A and executes algorithm 100, as illustrated by the flow chart of FIG. 2. In another embodiment, algorithm 100 could reside on the vehicle ECU 26. Display/control unit 28 also includes a variety of input devices through which an operator can input decisions, including an optional virtual override switch 34, a virtual override cancel switch 35 and a sensitivity adjustment knob 37.

Figure 2:
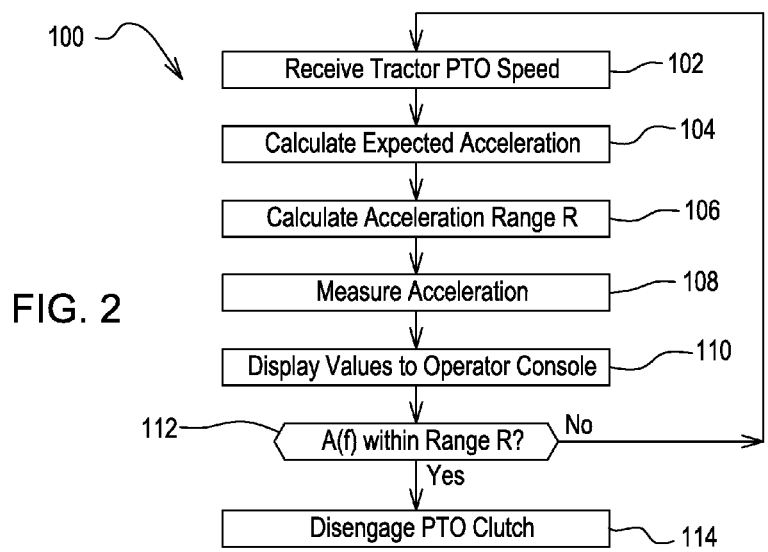
FIG. 2 is a logic flow diagram of an algorithm executed by the monitoring system of FIG. 1.

The vibration signal from each accelerometer is processed and analyzed by an algorithm 100 which is periodically executed by the implement ECU 20, as illustrated by the flow chart of FIG. 2.

In step 102 the implement ECU 20 reads the PTO ω(pto) speed from the communication bus 30 as provided by drivetrain ECU 26 as it monitors the PTO speed sensor 24. The driven blade speed ω(blade) is then calculated by applying the gear ratios for each gear box 16 to the PTO speed ω(PTO). In another embodiment, the implement ECU 20 may be directly connected to the PTO speed sensor 24 on the tractor 10 or a separate speed sensor (not shown) may be added to the driven unit or units of the implement 12 to determine rotational speed.

Step 104 calculates an expected acceleration value A(exp) for each set of mower blades 14 which represents the vibrations expected to be produced by a set of blades 14 which have a blade missing. A mower blade assembly (not shown) becomes unsymmetrical when one blade is missing, and thus becomes a rotating eccentric mass which produces a harmonic forced vibration at the frequency of ω(blade). The expected acceleration value A(exp) can be determined by treating the blade assembly vibration as a undamped forced vibration due to a rotating eccentric mass. The expected acceleration value A(exp) is calculated as follows: A(exp)= (m*r*ω(blade)^2)/M, where m is the mass of a blade, M is the mass of the mower (missing a blade), r is the radius of spinning blade and ω(blade) is the blade speed (in radians per second). Values for m, M and r are stored in the implement ECU 20. Using this equation, the expected peak to peak acceleration for a known PTO input (if a blade is missing) is determined. The frequency of this peak to peak acceleration is related to ω(blade) which is dependent upon the gearboxes of the mower and at the PTO speed ω(pto) output of the tractor. This expected peak to peak acceleration is translated to the frequency domain.

In step 106 an expected acceleration range R is then determined around the expected acceleration value A(exp), such as from 0.9×A(exp) to 1.1×A(exp). This range could be adjusted with percentages other than 10%. Preferably, this range could be adjusted by an operator using knob 37, or other operator control (not shown), so that the system could operate with a desired sensitivity to a blade loss event.

In step 108 the algorithm reads the acceleration signals from the acceleration sensors 18. These acceleration signals are processed by an A/D convertor (not shown) which is part of the microprocessor in the implement controller 20. These values used to calculate the amplitude of the signal A at the frequency of the blade 14 rotation ω(blade) using any of the numerous methods for transforming the signal from the time domain to the frequency domain. This frequency domain representation of the acceleration amplitude is treated as A(f).

Step 110 may be provided to transmit the acceleration values A(exp) and A(f) to the display 28.

Step 112 compares the magnitude of the peak to peak sensed acceleration value A(f) sensed at step 108 (at the frequency which corresponds to the blade rotation speed ω(blade) to the expected acceleration range R (at the same frequency w(blade)). If the sensed acceleration is not within the range, then it is determined that the mower has not lost a blade, no action is taken and the algorithm is directed back to step 102. If the sensed acceleration is within the range R, then it is determined that the mower has lost a blade, and the algorithm is directed to step 114.

Step 114 causes the drivetrain controller 22 to disengage the PTO clutch 17. Step 114 may also generate a warning message which is shown on the display 28. In addition other audible and/or visible signals can be displayed and/or generated.

Preferably, each sensed acceleration or vibration signal A(f) is filtered independently and each is separately compared to a corresponding expected acceleration range. For a mower which has different sets of blades spin which spin at a different speeds, different expected acceleration values are preferable in order to detect a missing blade. For a mower which has different blade assemblies which spin at the same speed, the same expected acceleration value could be used for all the blade assemblies.

The conversion of the above flow chart into a standard language for implementing the algorithm described by the flow chart in a digital computer or microprocessor, will be evident to one with ordinary skill in the art.

The PTO speed is read in from a CAN bus which connects controller 20 to controllers 22 and 26. The controller 20 also has stored in it the model of the mower which it is mounted to, the dimensions specific to implement model. Information, which includes, but is not limited to the following: ratios for gear boxes 16, mower mass, blade mass, and radius of which blades rotate.

The mower may be treated as a single degree of freedom system which is experiencing an undamped forced vibration. Since PTO speed is known, then the gear box ratios can be used to calculate the rotational speed of the blades. Blades are installed in pairs, when a blade is lost a eccentric rotating mass is created by the single offset blade which is still attached to the blade holder. This eccentric rotating mass then creates an oscillating force that generates an acceleration in the mower system. One can then calculate the acceleration in the system based upon the oscillating force and system mass. This acceleration is directly dependent upon the input rotational speed of the tractor PTO. In addition, the frequency of this oscillating force and ultimately the resultant acceleration is dependent upon the rotational speed of the tractor PTO.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A control system for an implement having a rotary blade driven by a drive unit, the blade control system comprising:
   an acceleration sensor for sensing vibrations of the blade and generating a sensed acceleration signal A(f); and
   a speed sensor for generating a drive unit or driven unit speed signal S(pto); and
   a control unit connected to the sensors and to the drive unit, the control unit generating, as a function of the speed signal, an expected acceleration value A(exp) representing a blade loss condition, the control unit comparing the sensed acceleration signal A(f) to the expected acceleration value A(exp), and the control unit stopping the drive unit from rotating the blade if the sensed acceleration signal A(f) is similar to the expected acceleration value A(exp).

2. The control system of claim 1, wherein:
   the control unit determines a range R of acceleration values around the expected acceleration value A(exp), and the control unit stopping the drive unit from rotating the blade if the sensed acceleration signal A(f) is within the range R.

3. The control system of claim 1, further comprising:
   an operator override switch connected to the control unit, the control unit preventing the stopping of the drive unit if the override switch is activated.

4. The control system of claim 2, wherein:
   the drive unit includes a PTO shaft driven by a drivetrain of the vehicle; and
   a gear box connected between the PTO shaft and the blade.

5. The control system of claim 4, wherein:
   the accelerometer is mounted on the implement.

6. The control system of claim 1, wherein:
   the accelerometer is oriented to maximize its sensitivity to vibration of the implement.

7. The control system of claim 1, wherein:
   the implement is coupled to a vehicle; and
   the control unit comprises an implement control unit on the implement, and a vehicle control unit mounted on the vehicle and connected to the implement control unit by a data bus.

8. A control system for a mower having a rotary blade driven by a gear box which is driven by a PTO shaft of a vehicle which is coupled to the mower, the vehicle having a drivetrain which is connected to the PTO shaft though a PTO clutch, the blade control system comprising:
   an acceleration sensor for sensing vibrations of the blade and generating a sensed acceleration signal A(f); and
   a PTO speed sensor coupled to the PTO shaft for generating a PTO speed signal S(pto); and
   a control unit connected to the sensors and to the PTO clutch, the control unit generating, as a function of the speed signal, an expected acceleration value A(exp) representing a blade loss condition, the control unit comparing the sensed acceleration signal A(f) to the expected acceleration value A(exp), and the control unit disengaging the PTO clutch if the sensed acceleration signal A(f) is within a certain range of the expected acceleration value A(exp).

9. The control system of claim 8, wherein:
the control unit determines a range R of acceleration values around the expected acceleration value A(exp), and the control unit stopping the drive unit from rotating the blade if the sensed acceleration signal A(f) is within the range R.

10. The control system of claim 8, wherein the control unit comprises:
an implement control unit on the mower; and
a vehicle control unit mounted on the vehicle and connected to the implement control unit by a data bus.

11. The control system of claim 7, further comprising:
an operator override switch connected to the control unit, the control unit preventing disengaging of the PTO clutch if the override switch is activated.

12. The control system of claim 7, wherein:
the accelerometer is mounted on the gear box.

13. The control system of claim 10, wherein:
the accelerometer is oriented to maximize its sensitivity to motion perpendicular to a fore-and-aft axis of the mower.

14. The control system of claim 7, wherein:
the accelerometer is oriented to maximize its sensitivity to motion perpendicular to a fore-and-aft axis of the mower.

15. The control system of claim 7, wherein:
the control unit high pass filters the acceleration signal.

* * * * *